(12) United States Patent
Mizunuma et al.

(10) Patent No.: US 9,086,304 B2
(45) Date of Patent: Jul. 21, 2015

(54) TERMINAL-SUPPORTING APPARATUS

(75) Inventors: Takehito Mizunuma, Chiryu (JP);
Takamitsu Kubota, Chiryu (JP); Toru Shimizu, Nagoya (JP); Yoshiyuki Kono, Obu (JP)

(73) Assignee: DENSO CORPORATION, Kariya (JP)

( * ) Notice: Subject to any disclaimer, the term of this patent is extended or adjusted under 35 U.S.C. 154(b) by 260 days.

(21) Appl. No.: 13/616,043

(22) Filed: Sep. 14, 2012

(65) Prior Publication Data

US 2013/0078852 A1 Mar. 28, 2013

(30) Foreign Application Priority Data

Sep. 27, 2011 (JP) ................................. 2011-210541

(51) Int. Cl.
| | | |
|---|---|---|
| *H01R 13/60* | (2006.01) | |
| *G01D 11/24* | (2006.01) | |
| *G01B 7/30* | (2006.01) | |
| *H01R 9/22* | (2006.01) | |
| *F02D 9/10* | (2006.01) | |
| *H01R 13/405* | (2006.01) | |

(52) U.S. Cl.
CPC ............... *G01D 11/245* (2013.01); *F02D 9/105* (2013.01); *F02D 9/107* (2013.01); *F02D 9/108* (2013.01); *G01B 7/30* (2013.01); *H01R 9/22* (2013.01); *H01R 13/405* (2013.01)

(58) Field of Classification Search
CPC .......... G01B 7/30; H01R 9/22; H01R 13/405; F02D 9/105; F02D 9/107; F02D 9/108; G01D 11/245
USPC ......... 123/346, 376–378, 391, 396, 399, 403; 73/114.36; 439/869–876, 891
See application file for complete search history.

(56) References Cited

U.S. PATENT DOCUMENTS 7,032,569 B2 * 4/2006 Ikeda et al. .................... 123/399
7,373,815 B2 * 5/2008 Kozawa et al. ............ 73/204.22

(Continued)

FOREIGN PATENT DOCUMENTS

| | | | |
|---|---|---|---|
| JP | 2005-326322 | 11/2005 | |
| JP | 2005326322 A | * 11/2005 | .............. G01L 19/14 |

OTHER PUBLICATIONS

Office Action (2 pages) dated Aug. 20, 2013, issued in corresponding Japanese Application No. 2011-210541 and English translation (2 pages).

(Continued)

*Primary Examiner* — Thomas Moulis
*Assistant Examiner* — Elizabeth Hadley
(74) *Attorney, Agent, or Firm* — Nixon & Vanderhye P.C.

(57) ABSTRACT

A terminal-supporting apparatus includes a resin part made of non-conductive resin material and a plurality of conductive terminals including parallel terminal portions which are directly supported by the resin part. The parallel terminal portions are electrically connected to each other through an electric element. The resin part supporting the parallel terminal portions is made of non-conductive resin material mixed with non-conductive reinforced fibers of which thermal expansion coefficient is smaller than that of the non-conductive resin material. An extending direction of the parallel terminal portion is referred to as a longitudinal direction and a direction perpendicular to the longitudinal direction is referred to as a perpendicular direction. The non-conductive reinforced fibers have a fiber direction which is substantially the same as the perpendicular direction.

8 Claims, 6 Drawing Sheets

(56) References Cited

U.S. PATENT DOCUMENTS

| | | | |
|---|---|---|---|
| 7,770,557 B2 * | 8/2010 | Ikeda et al. | 123/337 |
| 7,800,358 B2 * | 9/2010 | Akiyama et al. | 324/207.25 |
| 7,859,252 B2 * | 12/2010 | Ikeda | 324/207.25 |
| 8,479,707 B2 * | 7/2013 | Mase | 123/399 |
| 2005/0126536 A1 * | 6/2005 | Torii et al. | 123/399 |
| 2011/0114061 A1 | 5/2011 | Mase | |
| 2012/0181641 A1 * | 7/2012 | Hiramoto et al. | 257/421 |
| 2013/0063137 A1 * | 3/2013 | Ikeda et al. | 324/207.25 |

OTHER PUBLICATIONS

Office Action (6 pages), dated Jul. 29, 2014, issued in Chinese Patent Application No. 201210369655.7 and English translation (5 pages).

* cited by examiner

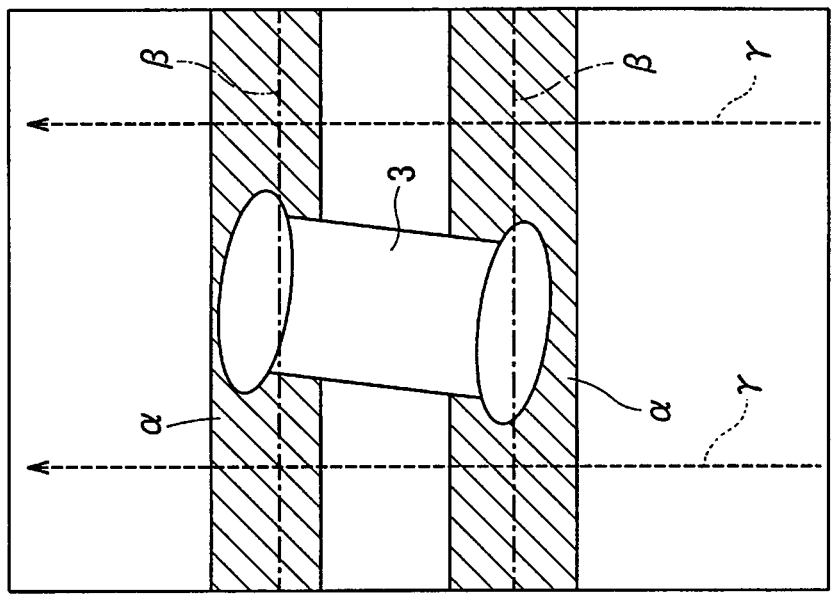
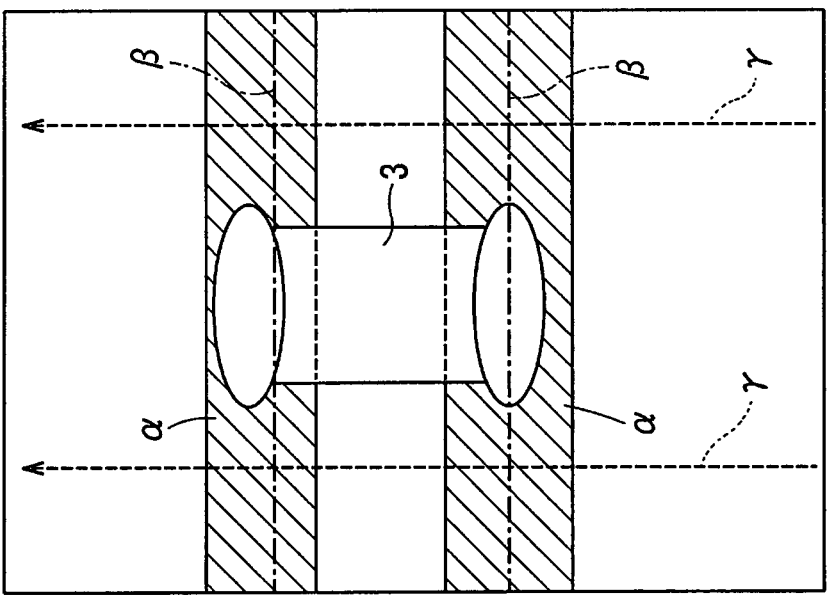

TERMINAL-SUPPORTING APPARATUS

CROSS-REFERENCE TO RELATED APPLICATION

This application is based on Japanese Patent Application No. 2011-210541 filed on Sep. 27, 2011, the disclosure of which is incorporated herein by reference.

TECHNICAL FIELD

The present disclosure relates to a terminal-supporting apparatus which supports a terminal connected to an electric element.

BACKGROUND

FIG. 6 is a perspective view of a conventional terminal-supporting apparatus provided with two terminals 2 which are arranged in parallel with each other. The terminals 2 are molded in a resin part 1. Further, the terminals 2 are electrically connected to an electric element 3. An electrode of the electric element 3 is connected to one of the terminals 2 and the other electrode of the electric element 3 is connected to the other terminal 2. Two terminals are connected through the electric element 3.

In the following descriptions, portions of each terminal 2 which are connected to the electric element 3 and extend in parallel with each other are referred to as parallel terminal portions α, an extending direction of the parallel terminal portions α is referred to as a longitudinal direction β, and a direction perpendicular to the longitudinal direction β is referred to as a perpendicular direction γ. The parallel terminal portions α are arranged in the perpendicular direction γ.

When the resin part 1 is heated or cooled, the resin material is thermally expanded or thermally shrunk. Due to the thermal expansion and thermal shrinkage, an interval between the parallel terminal portions α in the perpendicular direction γ is varied, whereby a stress (physical force) is generated in a connecting portion between the parallel terminal portions α and the electric element 3. If the resin part 1 receives thermal load variations repeatedly, the stress is also generated repeatedly. The connecting portion between the parallel terminal portions α and the electric element 3 may be damaged.

JP-2011-106314A (US-2011/0114061A1) shows that a terminal and a lead terminal are connected to each other by welding or soldering. However, it is not referred to a thermal stress applied to the connecting portion.

SUMMARY

The present disclosure is made in view of the above matters, and it is an object of the present disclosure to provide a terminal-supporting apparatus in which a thermal stress applied to a connecting portion between parallel terminal portions and an electric element is reduced.

According to the present disclosure, a terminal-supporting apparatus includes a resin part made of non-conductive resin material and a plurality of conductive terminals including parallel terminal portions which are directly supported by the resin part. The parallel terminal portions are electrically connected to each other through an electric element. The resin part supporting the parallel terminal portions is made of non-conductive resin material mixed with non-conductive reinforced fibers of which thermal expansion coefficient is smaller than that of the non-conductive resin material. An extending direction of the parallel terminal portion is referred to as a longitudinal direction and a direction perpendicular to the longitudinal direction is referred to as a perpendicular direction. The non-conductive reinforced fibers have a fiber direction which is substantially the same as the perpendicular direction.

BRIEF DESCRIPTION OF THE DRAWINGS

The above and other objects, features and advantages of the present disclosure will become more apparent from the following detailed description made with reference to the accompanying drawings. In the drawings:

FIGS. 5A and 5B are plan views showing a connecting portion between parallel terminal portions and a chip capacitor.

DETAILED DESCRIPTION

Figure 1:
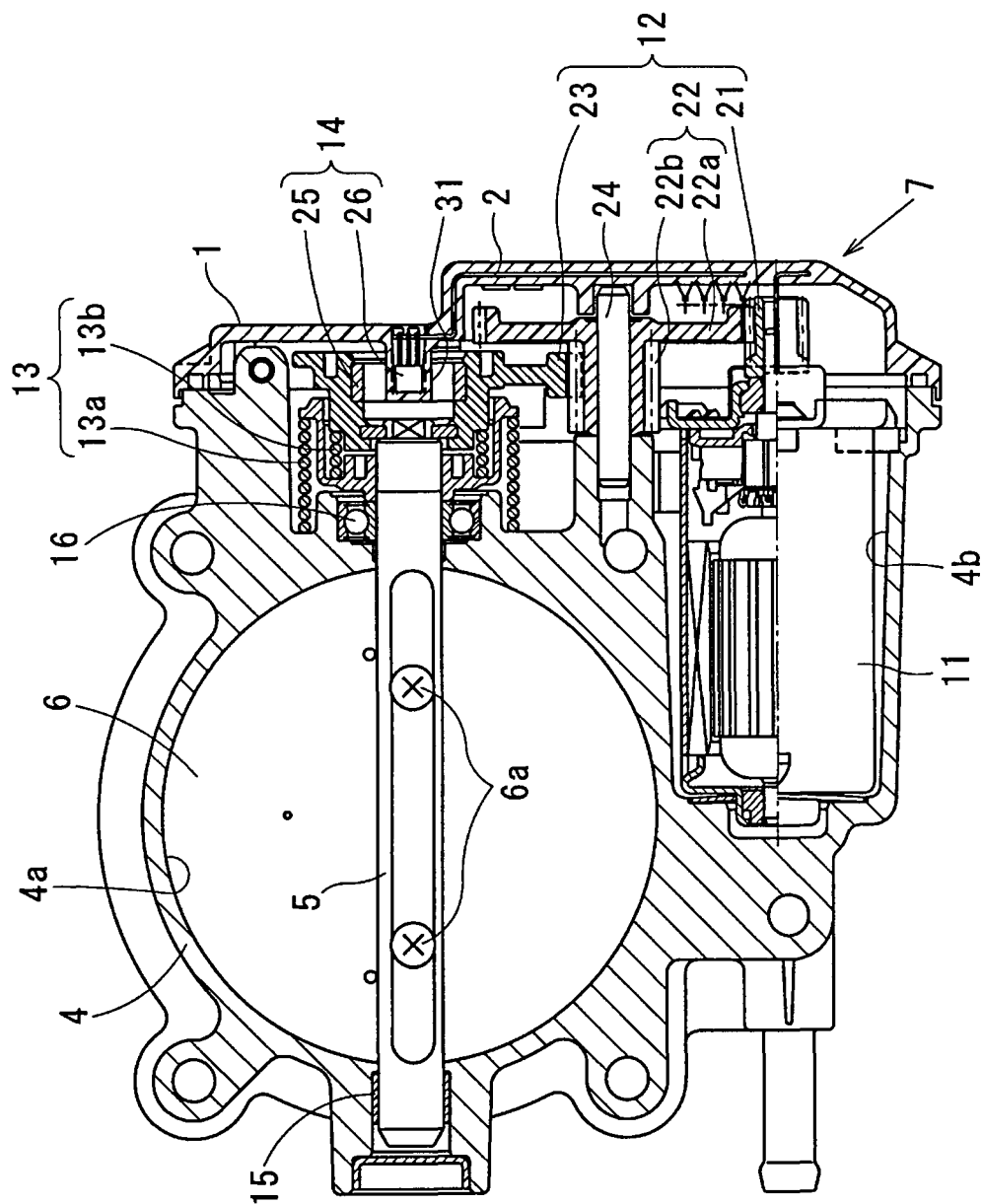
FIG. 1 is a cross sectional view of a throttle apparatus.

Referring to FIGS. 1 to 5, an embodiment of the present disclosure will be described hereinafter.

A terminal-supporting apparatus is comprised of a resin part 1 and a plurality of terminals 2 including parallel terminal portions α. The parallel terminal portions α are connected to each other through an electric element 3. The resin part 1 supporting the parallel terminal portions α includes reinforced fibers (glass fibers) in the perpendicular direction γ. Coefficient of thermal expansion of the reinforced fibers is smaller than that of the resin material of the resin part 1.

In the present embodiment, a terminal-supporting apparatus is applied to an electronic throttle. The electronic throttle is provided between an air-cleaner and an intake manifold to adjust intake air flow rate.

The electronic throttle is comprised of a housing 4 forming an intake passage 4a, a shaft 5 rotatably supported by the housing 4, a valve 6 connected to the shaft 5 to adjust flow passage area of the intake passage 4a, and an electronic actuator 7 driving the valve 6 through the shaft 5.

The electronic actuator 7 has an electric motor 11, a reduction gear 12 for driving the shaft 5, a biasing portion 13 biasing the shaft 5 and the valve 6, and a rotational angle sensor 14 for detecting a position of the shaft 5 and the valve 6.

The housing 4 is made of metallic material or resin material. A bolt inserting hole for installing the electric throttle on a vehicle is formed on an outer surface of the housing 4. Moreover, the housing 4 forms the intake passage 4a therein. The shaft 5 is supported by the housing 4.

As shown in FIG. 1, a left end of the shaft 5 is supported by the housing 4 through a bearing (metal bush) 15. A right end of the shaft 5 is also supported by the housing 4 through a baring (ball bearing) 16. The shaft 5 rotates along with the valve 6. The valve 6 is a butterfly valve made of metallic material or resin material. The valve 6 is fixed on the shaft 5 by screws 6a.

The electric actuator 7 is assembled to the housing 4. A cover 1 is provided to the housing 4. The housing 4 forms a motor chamber 4b in which the electric motor 11 is accommodated. Further, the housing 4 and the cover 1 accommodate the reduction gear 12 and the biasing portion 13.

The electric motor 11 is a well-known direct-current motor and is fixed to the housing 4 by screws.

The reduction gear 12 is comprised of a motor gear (pinion gear) 21, an intermediate gear 22 and an end gear (gear rotor) 23. The end gear 23 rotates along with the shaft 5.

The motor gear 21 is an external gear connected to an output shaft of the electric motor 11. The intermediate gear 22 is comprised of a large diameter gear 22a and a small diameter gear 22b which are connected to a supporting shaft 24. The large diameter gear 22a is always engaged with the motor gear 21. The small diameter gear 22b is always engaged with the end gear 23. The end gear 23 is an external gear connected to the shaft 5. The end gear 23 is made of resin material.

When the electric motor 11 is deenergized, the biasing portion 13 holds the valve 6 at an intermediate position between a full-open position and a full-close position. The biasing portion 13 is comprised of a return spring 13a biasing the valve 6 in a valve-close direction and a default spring 13b biasing the valve 6 in a valve-open direction.

The rotational angle sensor 14 is a throttle position sensor which detects an opening position of the valve 6. The detected position signal is transmitted to an engine control unit (ECU). Specifically, the rotational angle sensor 14 is comprised of a magnetic circuit 25 which generates magnetic flux change and two Hall ICs 26 which detect the magnetic flux change.

The ECU is an electronic control unit including a microcomputer. The ECU controls the electric motor 11 in such a manner that the actual valve position agrees with a target valve position.

Referring to FIGS. 2 to 5, the terminal-supporting apparatus applied to the rotational angle sensor 14 will be described. The cover 1 is made of poly butylene terephthalate (PBT). In FIG. 1, the left surface of the cover 1 is referred to as an inner surface and the right surface of the cover 1 is referred to as an outer surface.

A convex portion 31 is formed on the inner surface of the cover 1. The convex portion 31 is inserted into the magnetic circuit 25. Two Hall ICs 26 are disposed in the convex portion 31 through an IC-insert hole 32 formed in the outer surface of the cover 1.

The Hall IC 26 is comprised of an IC body 33 and three lead terminals 34 (power source lead 34a, grand lead 34b, output lead 34c).

The IC-insert hole 32 is rectangular-shaped to receive two IC bodies 33.

Figure 3A:
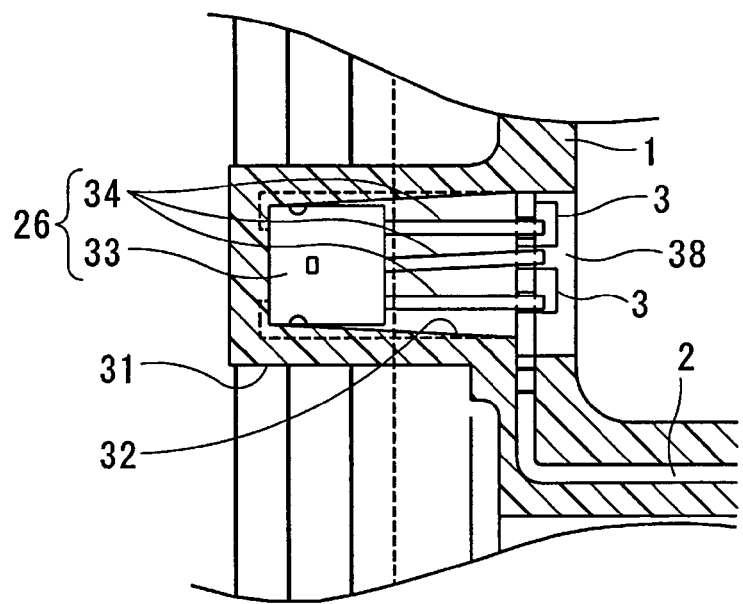
FIG. 3A is a sectional view of a portion "A" in FIG. 2.
Figure 3B:
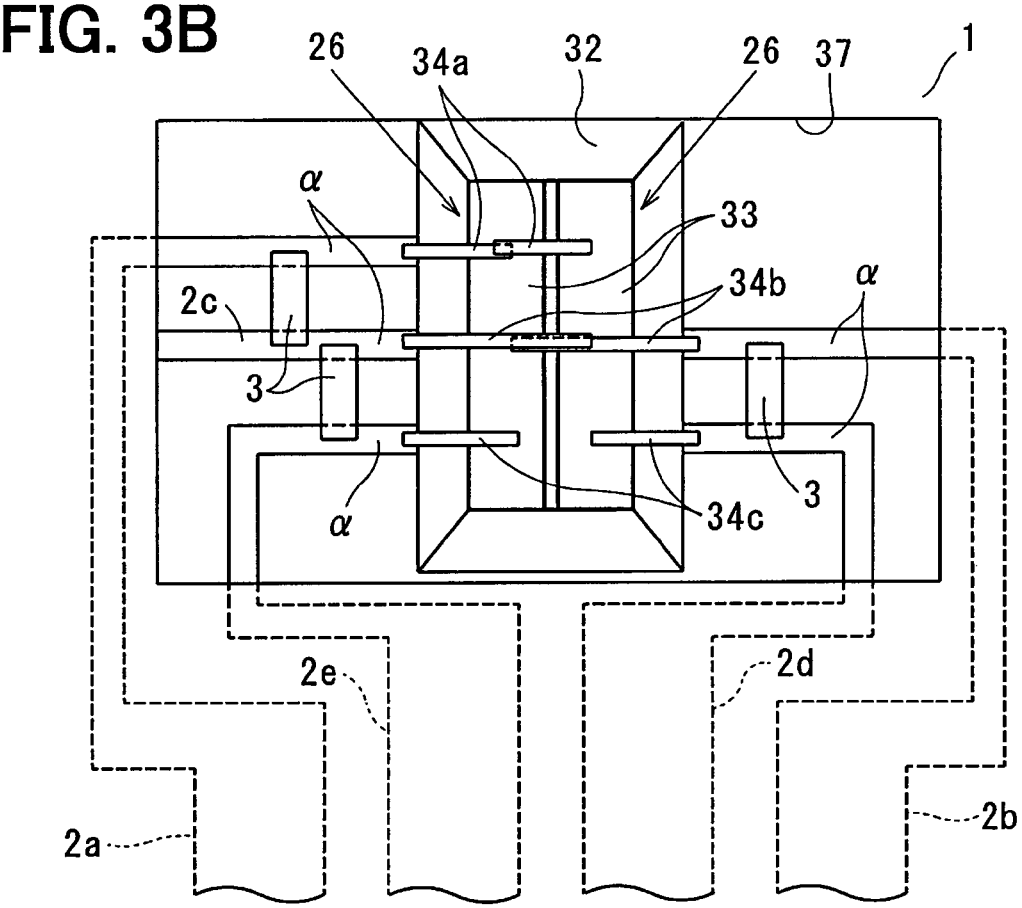
FIG. 3B is an enlarged view of the portion "A"
Figure 4:
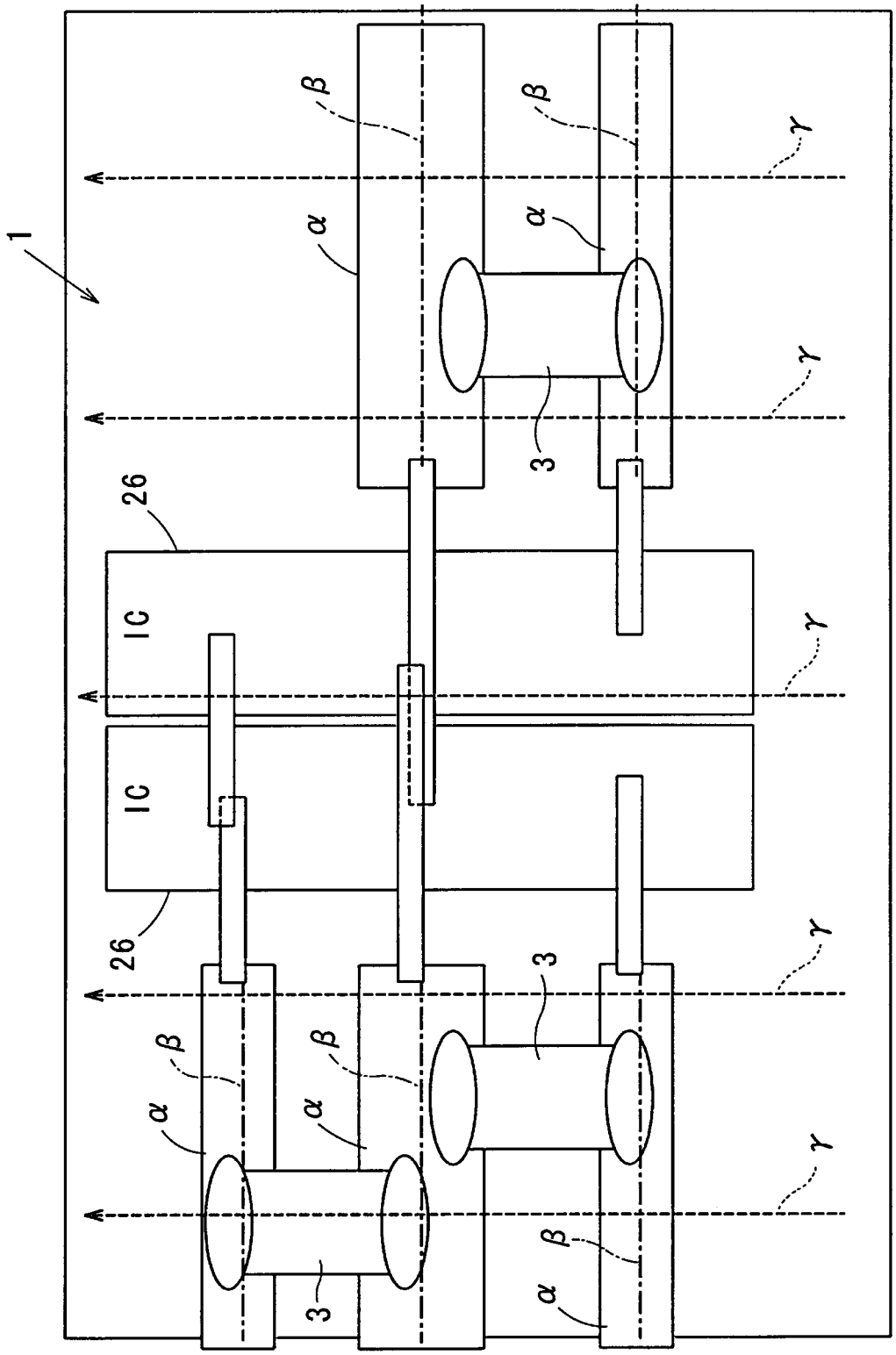
FIG. 4 is a view for explaining a fiber direction.
Figure 6:
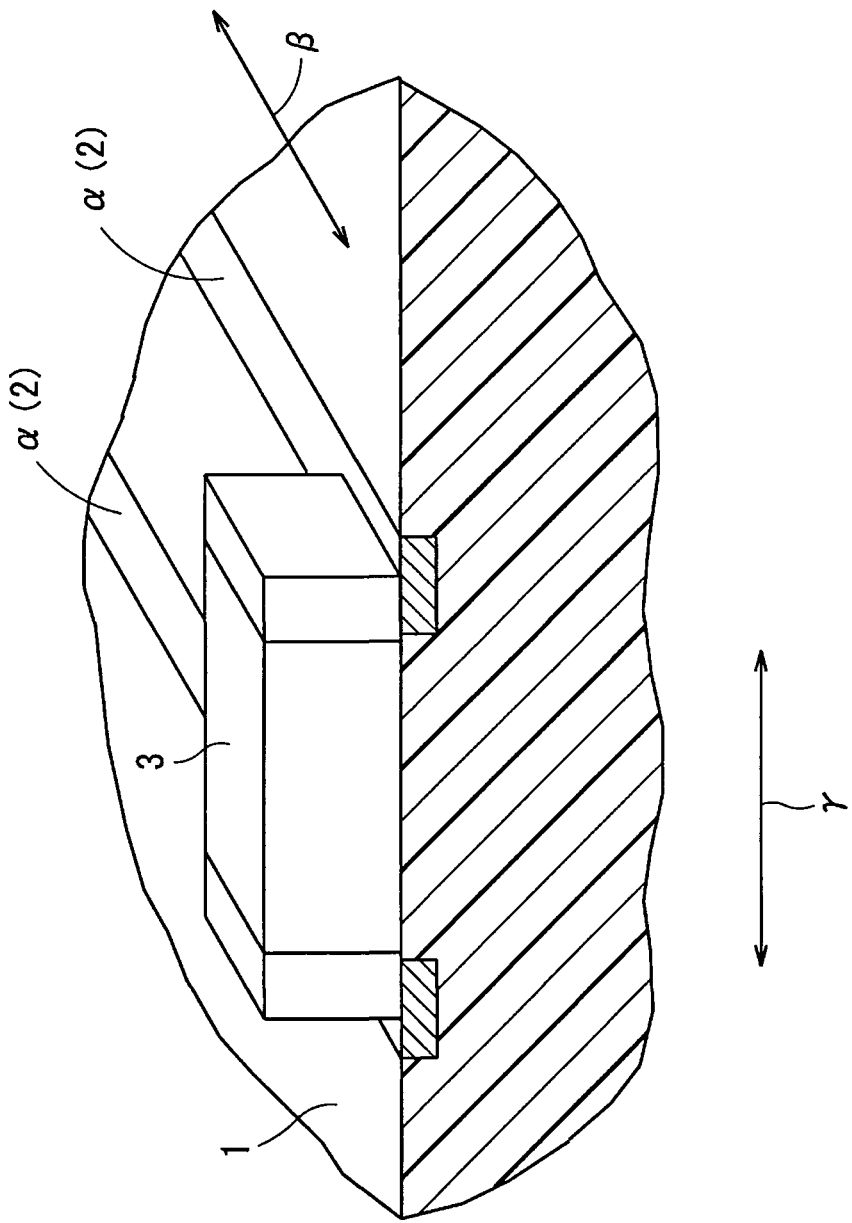
FIG. 6 is a perspective view of a connecting portion according to conventional art.

As shown in FIG. 3B, the lead terminals 34 is bent in L-shape and is connected to the terminal 2 by soldering.

A male connector 35 is provided to the cover 1. The male connector 35 includes a resin connector portion 36 in which the terminals 2 is disposed.

Specifically, two motor terminals (not shown) connected to the electric motor 11 and five terminals 2 connected to two Hall ICs 26 are molded in the cover 1.

Figure 2:
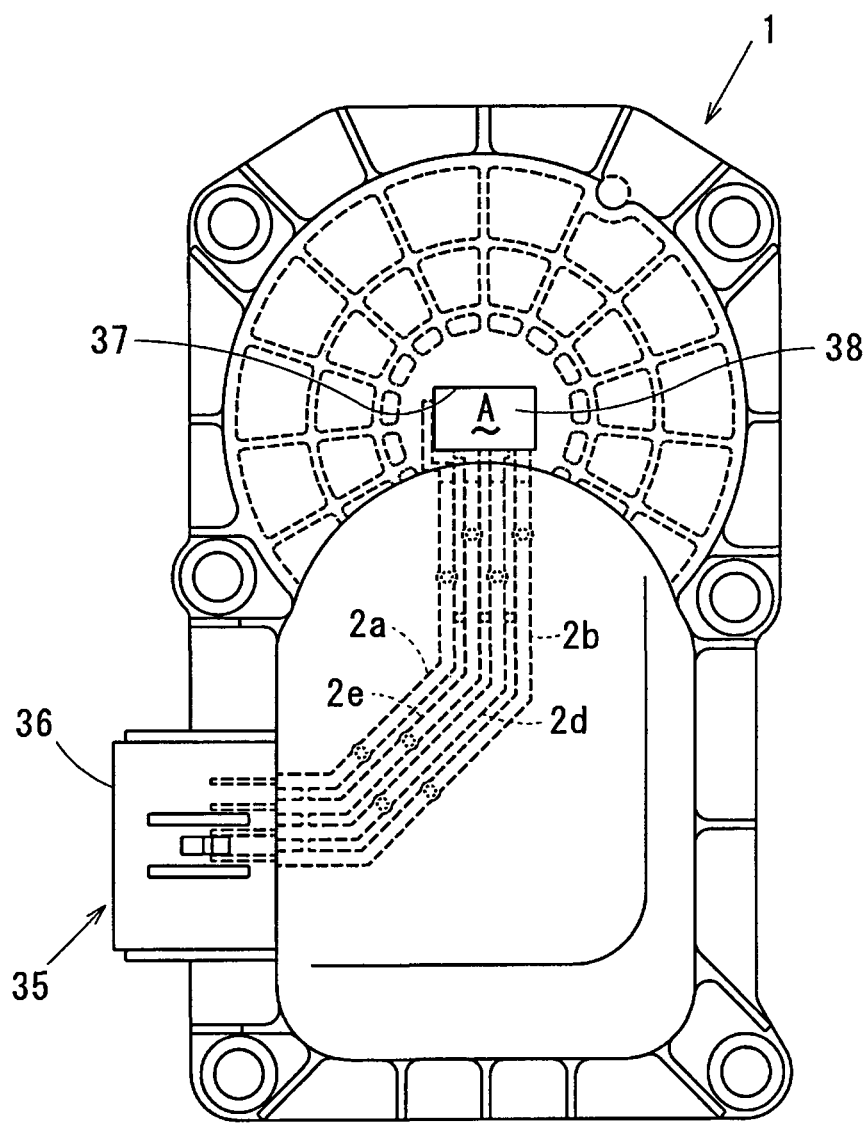
FIG. 2 is a side view of the throttle apparatus.

Each of terminals 2 is formed by pressing a sheet-metal. Referring to FIGS. 2 and 3B, it will be described about five terminals 2 connected to the Hall IC 26, hereinafter. Five terminals 2 is comprised of a power terminal 2a which receives an electric power supply from the ECU; a grand terminal 2b connected to a ground potential of the ECU; an auxiliary grand terminal 2c connected to the grand terminal 2b through the lead terminal 34 of the Hall IC 26; a first output terminal 2d; and a second output terminal 2e.

As shown in FIG. 3B, ends of five terminals 2 extend to the IC-insert hole 32 to be connected to the Hall IC 26. Outer surfaces of the terminals 2 are exposed from the cover 1 so that the lead terminal 34 is soldered to the terminals 2 and a chip capacitor (electric element) 3 is soldered on the terminals 2.

Specifically, a shallow concave portion 37 is formed on the outer surface of the cover 1, and each terminal 2 is arranged on the shallow concave portion 37. Each of the chip capacitors 3 is arranged on the terminals 2 which extend in parallel.

As described above, portions of the terminals 2 on which the electric element 3 is disposed and extend in parallel with each other are referred to as parallel terminal portion α, an extending direction of the parallel terminal portion α is referred to as a longitudinal direction β, and a direction perpendicular to the longitudinal direction β is referred to as a perpendicular direction γ. The parallel terminal portion α is arranged in the perpendicular direction γ.

Five parallel terminal portions α shown in FIG. 3B will be described specifically. The parallel terminal portion α extends in a direction which is perpendicular to a longitudinal direction of the Hall IC 26. That is, the parallel terminal portion α extends in the longitudinal direction β. Two parallel terminal portions α are arranged in right side of the IC-insert hole 32 and three parallel terminal portions α are arranged in left side of the IC-insert hole 32.

In FIG. 3B, the upper parallel terminal portion α in right side is a part of the grand terminal 2b and is connected to the grand lead 34b of the Hall IC 26 by soldering. The grand lead 34b corresponding to each Hall IC 26 is connected to each other by soldering. One of the grand leads 34b is connected to the grand terminal 2b, so that the grand leads 34b of two Hall ICs 26 are electrically connected to the grand terminal 2b.

In FIG. 3B, the lower parallel terminal portion α in right side is a part of the first output terminal 2d and is connected to the output lead 34c of the Hall IC 26 by soldering.

In FIG. 3B, the upper parallel terminal portion α in left side is a part of the power terminal 2a and is connected to the power source lead 34a of the Hall IC 26 by soldering. The power source lead 34a corresponding to each Hall IC 26 is connected to each other by soldering. One of the power source lead 34a is connected to the power terminal 2a, so that the power source lead 34a of two Hall ICs 26 are electrically connected to the power terminal 2a.

The middle parallel terminal portion α in left side is an auxiliary grand terminal 2c and is connected to the grand lead 34b of another Hall IC 26 by soldering. The grand leads 34b of two Hall ICs 26 are connected to each other by soldering. The parallel terminal portion α is electrically connected to the grand terminal 2b through the grand leads 34b of two Hall ICs 26.

The lower parallel terminal portion α in left side is a part of the second output terminal 2e and is connected to the output lead 34c of another Hall IC 26 by soldering.

Two parallel terminal portions α in right side are connected to each other through the chip capacitor 3. In FIG. 3B, the upper parallel terminal portion α in right side is connected to an electrode of the chip capacitor 3 by soldering. The lower parallel terminal portion α in right side is connected to another electrode of the chip capacitor 3 by soldering. As the result, two parallel terminal portions α in right side are connected to each other in the perpendicular direction γ through the chip capacitor 3.

Similarly, the upper and middle parallel terminal portions α in the left side are connected to each other through the chip capacitor 3. As the result, the upper and the middle parallel terminal portions α in left side are connected to each other in the perpendicular direction γ through the chip capacitor 3.

Similarly, the middle and lower parallel terminal portions α in the left side are connected to each other through the chip capacitor 3. As the result, the middle and the lower parallel terminal portions α in left side are connected to each other in the perpendicular direction γ through the chip capacitor 3.

After two Hall ICs 26 are inserted into the IC-insert hole 32 and the chip capacitors are soldered to each parallel terminal portions α, the IC-insert hole 32 and the shallow concave portion 37 are filled with potting agents (silicon resin) 38.

When the cover 1 receives heat load from engine and the like, it is likely that the cover 1 made from PBT may be deformed. If such deformation occurs, the connecting portion (soldering portion) between the parallel terminal portions α and the chip capacitor 3 receives physical stress.

According to the present embodiment, the cover 1 is made from resin material including glass fibers of which thermal expansion coefficient is smaller than PBT. The glass fibers are mixed with PBT in such a manner that the glass fiber direction agrees with the perpendicular direction γ.

The quantity, the thickness and the length of the mixed glass fibers are properly determined.

The glass fiber direction is controlled by varying an injecting direction of the melted resin into a cavity of die. Specifically, an injection gate through which melted resin is injected into a die cavity is positioned at a lower portion of the cover 1 in FIG. 2. The melted resin including the glass fibers is injected in a direction shown by dashed lines in FIG. 4. That is, the melted resin is injected into the die cavity in the perpendicular direction γ. Thereby, the glass fiber direction agrees with the perpendicular direction γ.

As described above, since the cover 1 includes the glass fibers in the perpendicular direction γ, the thermal expansion and the thermal shrinkage hardly occur in the glass fiber direction. The interval between the adjacent parallel terminal portions α can be made almost constant and the physical stress applied to the soldering portion can be reduced.

Even if the chip capacitor 3 is soldered to the parallel terminal portions α in the perpendicular direction γ as shown in FIG. 5A, or even if the chip capacitor 3 is soldered to the parallel terminal portions α in such a manner as to be tilted with respect to the perpendicular direction γ as shown in FIG. 5B, the physical stress applied to the soldering portion can be reduced, whereby damages of the soldering portion can be restricted.

Therefore, even if the cover 1 receives the thermal stress repeatedly, the connection between the parallel terminal portions α and the chip capacitor 3 can be ensured. As a result, the reliability of the rotational angle sensor 14 and the electric actuator 7 can be improved, and the reliability of the electronic throttle can be improved.

[Modifications]

Instead of the glass fibers, other kinds of fibers may be mixed with PBT to improve the strength of the cover 1.

The cover 1 may be made from resin material other than PBT.

The parallel terminal portions α and the chip capacitor 3 may be molded in the cover 1.

A chip resistor, a chip inductor, a chip LED, a chip diode, a chip varistor and the like can be employed as the electric element 3. The electric element 3 may have lead wires.

The electric element 3 may be connected to the parallel terminal portions α by welding, brazing and the like instead of soldering.

The present disclosure of the terminal-supporting apparatus can be applied to a device other than the rotational sensor of the electronic throttle.

What is claimed is:

1. A terminal-supporting apparatus comprising:
a resin part made of non-conductive resin material;
a plurality of conductive terminals including parallel terminal portions which are directly supported by the resin part; and
an electric element of which one electrode is connected to one parallel terminal portion and of which another electrode is connected to another parallel terminal portion, wherein
an extending direction of the parallel terminal portion is referred to as a longitudinal direction;
a direction perpendicular to the longitudinal direction is referred to as a perpendicular direction, which corresponds to an extending direction of the electric element;
the resin part supporting the parallel terminal portions is made of the non-conductive resin material mixed with non-conductive reinforced fibers of which thermal expansion coefficient is smaller than that of the non-conductive resin material; and
the non-conductive reinforced fibers have a fiber direction which is substantially the same as the perpendicular direction.

2. A terminal-supporting apparatus according to claim 1, wherein
the fiber direction of the non-conductive reinforced fibers is adjusted when the non-conductive resin material is injected to a molding die to form the resin part.

3. A terminal-supporting apparatus according to claim 1, wherein
the non-conductive reinforced fibers are glass fibers.

4. A terminal-supporting apparatus according to claim 1, wherein
the electric element is a tipped type element having no lead wire.

5. A terminal-supporting apparatus according to claim 1, wherein
the parallel terminal portion is insert-molded into the non-conductive resin material.

6. A terminal-supporting apparatus according to claim 1, wherein
the conductive terminals are electrically connected to a lead terminal of a Hall IC of a rotational angle sensor.

7. A terminal-supporting apparatus according to claim 6, wherein
the rotational angle sensor is installed to an electric actuator having an electric motor and a reduction gear; and
the rotational angle sensor detects a rotational angle of a shaft driven by the reduction gear.

8. A terminal-supporting apparatus according to claim 7, wherein
the electric actuator drives an electronic throttle which adjusts an fluid passage area of an intake passage, and the shaft rotates along with a valve disposed in the intake passage.

* * * * *